(12) United States Patent
Hathaway et al.

(10) Patent No.: US 7,587,343 B2
(45) Date of Patent: Sep. 8, 2009

(54) METHODS FOR SELECTING, ORDERING AND PURCHASING GLASS PRODUCTS

(75) Inventors: Edwin Hathaway, Santa Monica, CA (US); Ronald J. Spellich, Meadows, IL (US); Mateo Neri, Maliboo Lake, CA (US)

(73) Assignee: Oldcastle Glass, Inc., Plano, TX (US)

(*) Notice: Subject to any disclaimer, the term of this patent is extended or adjusted under 35 U.S.C. 154(b) by 256 days.

(21) Appl. No.: 11/823,501

(22) Filed: Jun. 28, 2007

(65) Prior Publication Data

US 2008/0275793 A1    Nov. 6, 2008

Related U.S. Application Data

(62) Division of application No. 10/456,381, filed on Jun. 6, 2003, now Pat. No. 7,257,548.

(60) Provisional application No. 60/338,791, filed on Jun. 14, 2002.

(51) Int. Cl.
    *G06Q 30/00*    (2006.01)
(52) U.S. Cl. .................................... 705/26
(58) Field of Classification Search ............ 705/26, 705/27
    See application file for complete search history.

(56) References Cited

U.S. PATENT DOCUMENTS 6,801,826 B2 * 10/2004 Tanabe .................. 700/121

2003/0177076 A1 * 9/2003 Might et al. ................ 705/28

OTHER PUBLICATIONS

Ruth Gal, "EZFace.com Inc. Pioneer of Internet Mass Personalization and Virtual Visualization", PR Newswire, New York: Jul. 20, 2000, p. 1, http://proquest.umi.com/pqdweb?did=56700249&sid=1&Fmt=3&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—Winstead PC

(57) ABSTRACT

A system, apparatus and method for facilitating the selection, purchasing and ordering glass products, which is informative to guide a novice user in selecting a glass product, even where the glass is comprised of glass panels of more than one manufacturer, the present invention providing an apparatus with a processor which is controlled by software to facilitate a selection process which integrates the comparison of glass products and their properties, as well as, including particular properties of particular components of a glass product, the apparatus can work with a user input device, such as a keyboard or mouse, and is programmed to display graphics associated with selections and potential selections for glass products. The system and method providing selection menus for display on a display device and an animation graphic associated with a selection presented to the user. The system, apparatus, and method integrates the glass product selection information which the user chooses, and preferably the invention makes selections for the user, based on the user's previous choices and specified target performances to present to the user potential glass products.

15 Claims, 9 Drawing Sheets

FIG. 1

OUTBOARD LITE
Low E

Select fabricated glass product: INSULATING GLASS

| Monolithic Glass |
| INBOARD LITE |
| Laminated Glass |
| Low E |
| Insulating Glass |
| Neutral |

1/4" AFG Comfort E2®low-e #3 on clear
1/4" AFG Comfort TI-AC®36 low-e #3 on clear
1/4" AFG Comfort TI-AC@40 low-e #3 on clear
1/4" AFG Comfort TI-PS®low-e #3 on clear
1/4" AFG Comfort TI-R®low-e #3 on clear
1/4" Pilkington Energy Advantage™ low-e #3 on clear

TARGET PERFORMANCE
Nominal Thickness
Visible Reflectance
Visible Transmittance
U-Value (Gas Fill: Air)
Solar Heat Gain Coefficient

ACTUAL PERFORMANCE
Nominal Thickness
Visible Reflectance
Visible Transmittance
U-Value
Solar Heat Gain Coefficient
Approved Glass Fabricator

SPEC SHEET

CONTACT US

FIG. 2

| ARCHITECTURAL GUIDE SPECIFICATION |
| --- |
| SECTION 8800 GLAZING |

Note to Specifiers:
The specifications below are offered as desirable inclusions in glass and glazing specifications (section 8800), but they are not intended to be complete. An appropriate and qualified Architect or Engineer must verify suitability of a particular product for use in a particular application as well as review final specifications.

PRODUCTS

| | |
| --- | --- |
| Approved Glass Fabricator | Oldcastle Glass |
| Glass Description | FLOAT GLASS |
| | 1. Annealed clear float glass shall meet or exceed requirements of ASTM C1036, Type I, Class 1, Quality Q3. |
| | 2. Heat-strengthened clear float glass shall meet or exceed requirements of ASTM C1048, Type I, Class 1, Quality Q3, Kind HS. |
| | 3. Tempered clear float glass shall meet or exceed requirements of ASTM C1048, Type I, Class 1, Quality Q3, Kind FT. |
| | 4. Glass shall be annealed, heat-strengthened or tempered as required by codes and specified on drawings. |
| Sealed Insulating Glass (IG) Vision Units (vertical) | GENERAL |
| | 1. Provide fabricated IG units consisting of organically sealed lites of glass enclosing a hermetically sealed, dehydrated airspace. |
| | 2. Performance characteristics designated for insulating glass are nominal values based on published test data for units with ¼" thick lites of glass and ½" thick airpace. |
| | 3. U-values indicated are expressed in the number of BTU's per hour per square foot per degree Fahrenheit. |
| | 4. Provide insulating glass units with performance classification per ASTM E773/E774. CBA for seal durability. |
| | 5. Provide IGCC certified insulating glass units. |
| | IG VISION UNIT PERFORMANCE CHARACTERISTICS |
| | 1. Exterior Lite<br>¼" PPG Solarban® 80 low-e #2 on clear |
| | 2. Interior Lite<br>laminated 1/8" clear AN – 0.030" clear Saflex pvb – 1/8" PPG Sungate® 500 on clear |
| | 3. ½" Cavity<br>Air-filled |
| | 4. Performance Characteristics<br>Shading Coefficient    0.25<br>Solar Heat Gain Coefficient    0.22<br>Tvis    44<br>Rvis (out)    32<br>Uwinter    0.29 |

Contact Oldcastle Glass at (866) OLDCASTLE for samples or additional information concerning performance, strength and deflection, thermal stress or application guidelines.

Fig. 9

METHODS FOR SELECTING, ORDERING AND PURCHASING GLASS PRODUCTS

CROSS-REFERENCE TO RELATED APPLICATION

This application is a divisional of, and claims priority to, U.S. application Ser. No. 10/456,381, filed on Jun. 6, 2003, now U.S. Pat. No. 7,257,548 and claims priority to U.S. Provisional Patent Application Ser. No. 60/338,791, filed on Jun 14, 2002, the complete disclosures of which are herein incorporated by reference.

BACKGROUND OF THE INVENTION

1. Field of Invention

The present invention relates to a method, apparatus and system for selecting, ordering and purchasing glass products, in particular glass fabrication products used in the construction of doors, windows, skylights, storefront, curtainwall, and other residential and commercial glass applications.

2. Brief Description of the Related Art

Glass panels are used widely in the construction of buildings, and are primarily used in the form of a door or window. The glass window or door panel may comprise a single layer of glass, or multiple layers of glass, laminated together or separated with an insulating material or gas there between. For example, insulating glass fabrications may have two panels of glass separated by an insulator, such as air or argon gas, which is sealed between the glass panels.

Glass products are utilized to satisfy a variety of aesthetic as well as functional requirements. For example, an architect designing a structure, such as a building or dwelling, typically begins the glass selection process by specifying certain colors for the glass which will comprise the windows or doors. Architects and designers may select certain colors for glass in residential and commercial applications. Glass color is integrated by the designer or architect in conjunction with the other building materials, including their textures and colors.

The color of glass may affect other physical properties of the glass or bear a relationship to characteristics of the glass. For example, performance characteristics for glass, may include colors, transmission, reflection, transparency, absorption, thickness, weight, and other physical or observable properties. In the past it has been time-consuming and difficult to determine the glass requirements to be included in a glass specification. For example, one traditional way to obtain information needed in writing a glass specification is to manually sort through numerous catalogs, or reference sheets identifying characteristics for glass. This method generally involves looking through a manufacturer's catalog to ascertain whether there is a particular glass that meets ones requirements for color and performance. Often an individual may look to more than one manufacturer's catalog and continue this process in search of a particular glass, or glass fabrication. The process is even more complex when more than a single glass panel is involved, as many glass specifications written today comprise insulating glass or laminated glass panels. Many codes and regulations mandate minimum insulation requirements that must be met by the specified glass products. The selection of glass products has largely been through reference to a single company's product catalog, presenting for selection the glass products of that company.

Another traditional way to arrive at a glass product is to consult a trained product representative who would utilize a computer software program, which is essentially a database of glass information from which calculations may be made. This type of program does not provide a specification, but rather, provides a basic result of a calculation. One would then take the numbers obtained from the calculation and interpret them in order to finalize the glass selection process. From there, the glass specification would be developed. With this prior method, it appears that even after ascertaining the calculated values, there still needs to be prepared a glass specification, which requires the utilization of the information from the calculations obtained with the program. Once calculated, in the event that the glass performance characteristics specification do not satisfy the target performance requirements, changes would require recalculating the numbers in order to provide acceptable color and performance characteristics. The recalculation can take place many times before a desirable specification is obtained, and the recalculation generally requires that the user perform an additional calculation, in the same manner as the first calculation. This process is not only time consuming, but requires users to start over each time a new calculation is to be performed. And even then, after determining that a particular glass product, when the performance calculation is completed, would potentially meet the properties desired, after arriving at a glass specification, often a sample must be obtained to visually evaluate the glass. Since the calculation may be time consuming, calculating, deriving a specification and obtaining a sample may be done several times before a suitable glass selection is arrived at. This process can often take several days or much longer.

The software available for use in connection with the calculation of numeric values for certain properties of glass products generally requires the user to have detailed prior knowledge in order to select a glass for a starting point. From there, the type of glass which the user selects, either from the user's own prior knowledge or a catalog, could be tested to determine whether that selection would be appropriate for the performance properties desired. A drawback of this type of process is that the user was essentially required to possess particular knowledge in order to select a starting point to make a glass selection. From there, calculations would be made and the user could test the calculations arrived at with the program against the desired performance properties for the glass. If the performance properties were not acceptable, then the user would repeat the calculation from the beginning, selecting another glass product to test.

One example of a prior software program used in connection with glass products is WINDOW 4.1, a program which compares a user's glass product input with a database of glass performance characteristics for the selected glass product to determine the selected product performance properties. The database information for the program comprises measured characteristics for a number of glass products which are recalled when the associated glass product is selected by the user.

In many instances selecting a glass product is even more complex, since a glass fabrication may, as mentioned above, comprise a composite of one or more glass panels which can be laminated together, include glass coatings or other performance enhancing materials. Further adding to the array of the glass structure may be films or layers between the composite, such as insulating materials including air, argon or other gases. All of these additional components affect the performance characteristics of the glass. In addition, often, it may not be desirable for a single manufacturer of a glass panel to supply both panels or components used to comprise a glass product. This may be the case, for example, where the glass product is an insulating or laminated product. In many instances, it may be necessary to utilize products for an insulating or laminated glass product which are supplied by one or more different manufacturers. This further adds to the complexity of selecting glass products and arriving at a glass specification which will satisfy the performance characteristics desired for the application. Designers who work with glass products which are a significant element of a structure or other design, a most common example being window panels of a building, must take into consideration the performance properties of the glass, and if laminated, coated, or multilayered, the properties of any other materials, as well as their cumulative or combined effect on the glass.

A need exists for a way to facilitate glass selection so that experienced or novice users may arrive at a glass specification to facilitate selecting a glass product, ordering a glass product, and purchasing a glass product, without requiring the user to preselect a product, and which is informative to guide the user in selecting a glass product, even where the glass is comprised of glass panels of more than one manufacturer.

SUMMARY OF THE INVENTION

The present invention provides an apparatus, system and method for selecting, ordering and purchasing of glass products. The present invention provides an apparatus with a processor which is controlled by software to facilitate a selection process which integrates the comparison of glass products and their properties, as well as, including particular properties of particular components of a glass product. The invention provides a method, apparatus and system for the selection of glass products which facilitates the presentation of potential glass product selections for both novice and experienced users who access stored data from a data file, using a computer. The apparatus can work with a user input device, such as a keyboard or mouse, and is programmed to display graphics associated with selections and potential selections for glass products.

The invention facilitates the glass selection and specification process which architects, designers and specifiers undertake in arriving at a glass specification for a building project. The target performance properties for a glass product may be used to arrive at a specification in conjunction with aesthetic properties (color). The invention facilitates obtaining performance characteristics for the glass product which satisfy the performance targets of the architect, designer or specifier. The performance targets preferably are achieved in conjunction with the color choice, another property of the glass products which may be taken into consideration in arriving at a glass specification. Spectral performance data for individual glass products is stored in a data storage device and may be displayed for view to provide information about a particular glass component or glass product.

An animation graphic preferably may be provided and associated with a selection presented to the user. The animation graphic facilitates instructing the user of the associated selection. Preferably, the animation graphic is stored in a data file, which is retrieved and displayed to the user on a screen when the user input device encounters the associated selection.

The selection, referred to as a glass performance property, may be a glass type, such as a glass fabrication or rating, or physical property, or combinations of these. In this manner, the data stored in the data storage device may provide information concerning glass products and properties of the products. The system, apparatus, and method integrates the glass product selection information which the user chooses by actuating an input device, and preferably, makes selections for the user, based on the user's previous choices to present to the user potential glass products. The glass products may comprise a fabrication which includes glass panels from one or more manufacturers.

The potential glass products are ascertainable from a specification, or glass specification, which is arrived at through processing with the computer the selections input by the user.

It is an object of the present invention to provide a novel method for selecting, purchasing and ordering glass products which may be used in a variety of commercial, residential or industrial applications.

It is another object of the present invention to provide a method, system and apparatus for facilitating the development of a performance-based architectural glass specification from which glass products can be ordered and purchased where the color and performance targets may be selected in accordance with the designer's requirements.

It is another object of the present invention to provide a novel method which permits a user to change one or more previously made glass property selections without having to reinput other previously made glass property selections which the user desires to be taken into account.

It is another object of the present invention to provide a display of available glass product choices when particular selections are made by the user.

It is another object of the present invention to provide an animation graphic which is associated with a glass property or glass type for display when the input device is moved to correspond with a glass property or type.

It is a further object of the present invention to provide a text window which appears on a display when the input device is moved to correspond with a glass property or type.

It is a further object of the present invention to provide a graphic window which is selectively movable on the display from one location to another location to provide information about a glass product.

It is another object of the present invention to provide two or more graphics windows which are selectively movable on the display from one location to another to provide information about two or more respective glass products for facilitating a comparison between selections.

It is another object of the present invention to provide a novel method, apparatus and system for facilitating the selection, ordering and purchasing of glass products, where the glass product may be constructed from the components of one or more manufacturers.

It is another object of the present invention to provide a glass performance characteristic for ascertaining a glass specification from which an order for a glass product may be made.

It is another object of the present invention to provide a glass performance characteristic for ascertaining a glass specification which may be used for purchasing a glass product.

BRIEF DESCRIPTION OF THE DRAWING FIGURES

FIG. 1 is a printout of a screen display showing the fabrication menu.

FIG. 2 is a printout of a screen display showing an information window.

FIG. 9 is a printout of a glass specification.

DETAILED DESCRIPTION OF THE INVENTION

Figure 3:
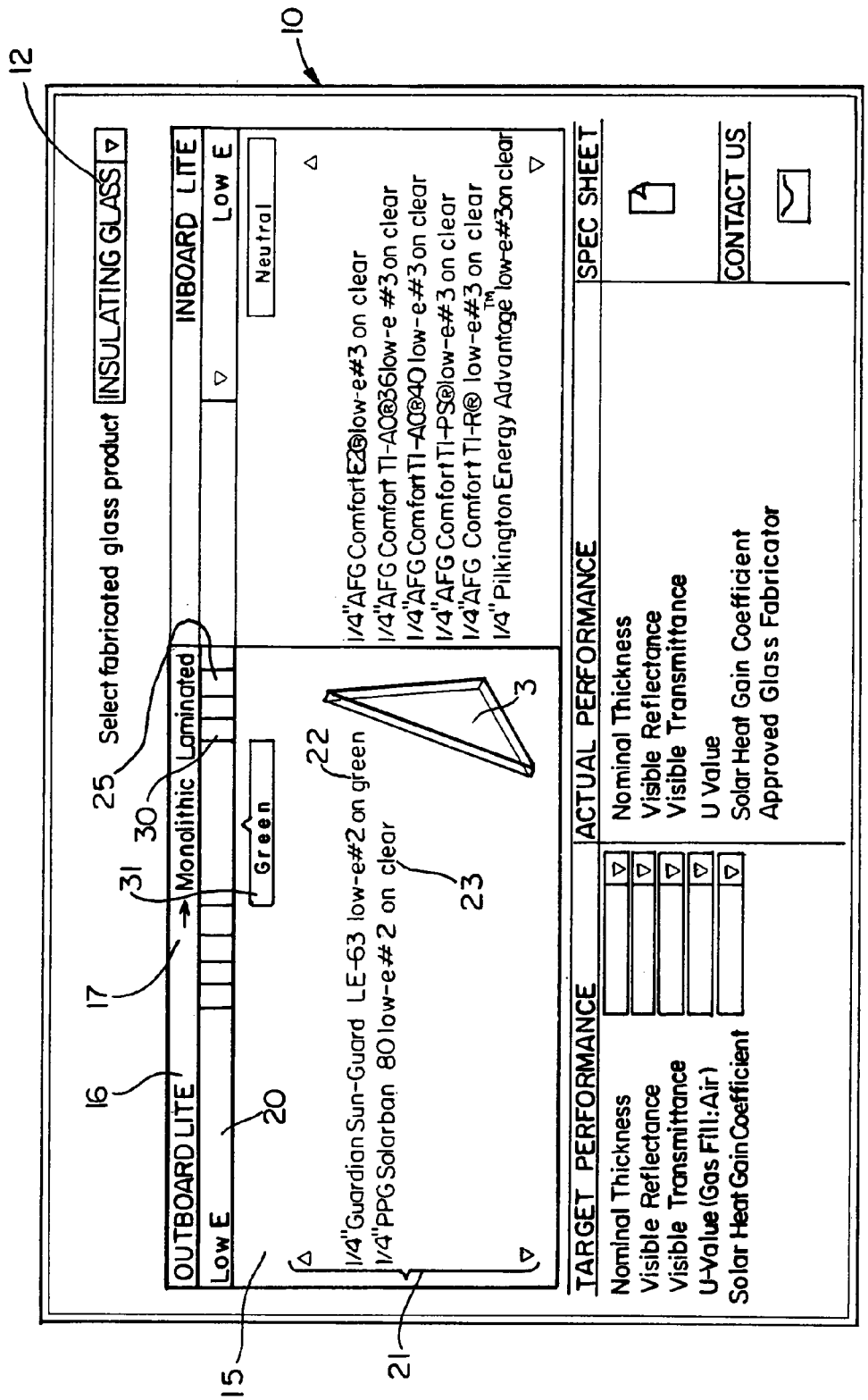
FIG. 3 is a printout of a screen display showing the outboard lite selection window and the glass type selections.

The present invention provides an apparatus, system and method for selecting, ordering and purchasing glass products. The present invention is described herein in connection with glass products which may comprise windows, doors, doorlites, skylights, storefronts, curtainwalls or glass panels for their construction. The apparatus of the present invention provides a processor, and a data storage device which can operate in conjunction with a user input device, and a viewing device, such as a monitor on which to view the processed information. The processor may be provided in the form of a computer. A user input device, such as, for example, a mouse or keyboard may be used to facilitate the user's interaction with the apparatus. Alternately, the user input device may comprise a touch panel or touch screen monitor.

Software is preferably implemented to manage the processor to facilitate the operations involved in the selection of the glass product from user inputs and data stored in the data storage device. Glass product information is preferably stored in the data storage device. The data storage device may comprise a computer hard drive, disk or other storage media. The stored data may comprise glass type data. An example of glass type data may include fabrication data, such as information about monolithic glass, insulating glass, and laminated glass, as well as spectral data for glass components and glass products which are sought to be ordered and purchased. The system may be operated directly on a computer or through a communications link, such as the Internet, where a remote computer can be used to make selections and view data.

Figure 2:
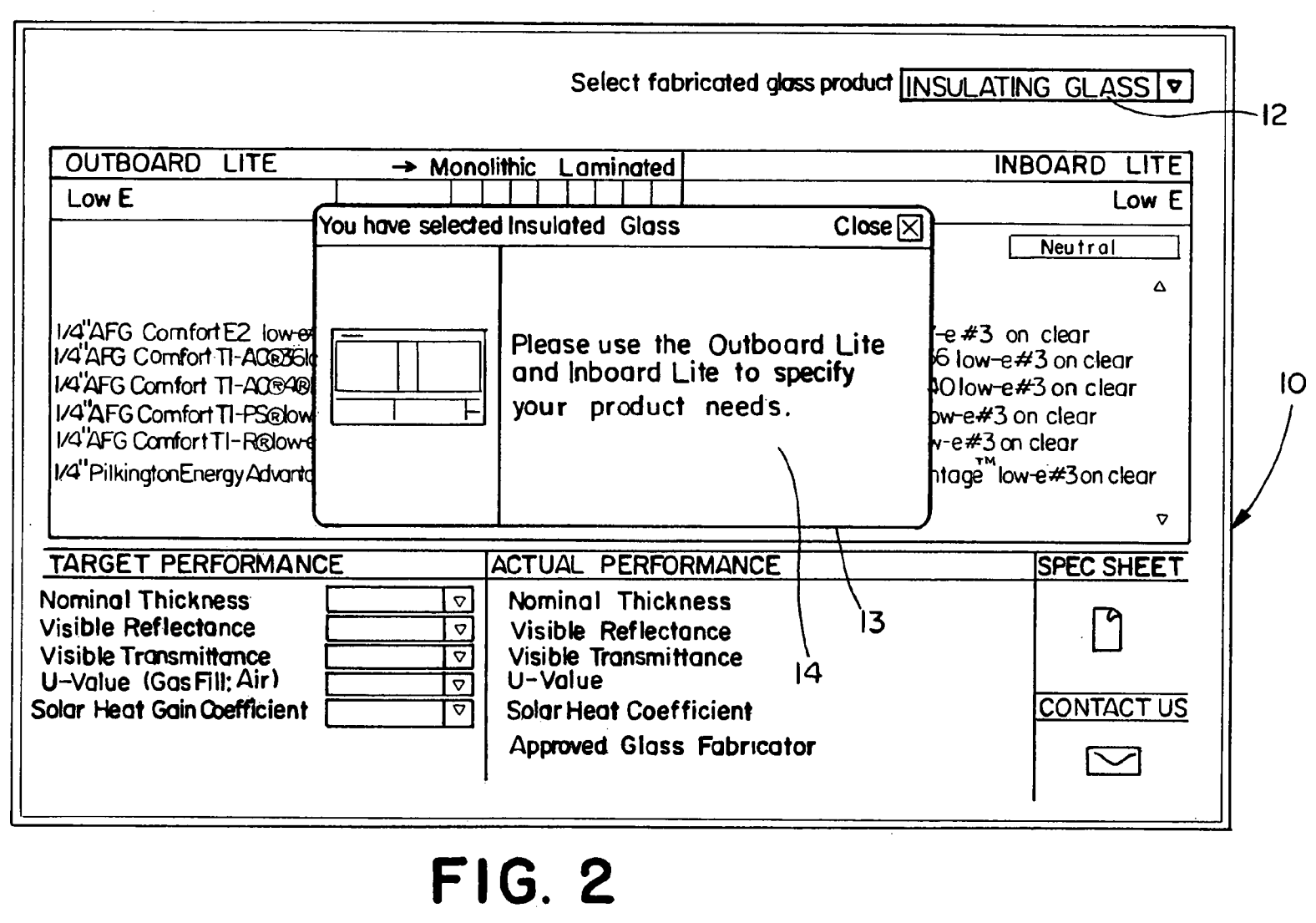

FIG. 1 shows a preferred embodiment of a screen display 10, illustrating a first selection menu or fabrication menu 11 for glass fabrication types, which include laminated glass, monolithic glass, and insulating glass. Each fabrication type has different properties and may be employed by a designer or architect for a particular purpose. In FIG. 1, the fabrication selection window 12 shows the user's selection, in this example, "insulating glass". Referring to FIG. 2, information is displayed in an information window 13 when the user has selected a glass fabrication type, such as in this illustration where insulating glass is selected. The information window 13 displays information relating to the fabrication type selection. In this example, where insulating glass is selected, the farther guidance information, which appears in the information window 13, is presented for display to the user. The guidance information 14, shown comprising text and a graphic map of the screen display, is stored in the data storage device and displayed on a the screen of the display unit, such as for example a monitor, when the processor processes the user's input from the fabrication menu 11 selection.

Referring to FIG. 3, there is illustrated a second selection window or outboard lite selection window 15 which presents further information to the user for arriving at a glass specification for the insulating glass fabrication type selected from the fabrication menu 12. The outboard lite selection window 15 is displayed. Glass product performance characteristics are related to the physical properties of the glass which will ultimately be used in the manufacture of the desired glass product for which the user is seeking a specification. The outboard lite selection window 15 identifies glass types for selection. As illustrated in this example, laminated and monolithic glass types are identified and appear as potential selections in the outboard lite title bar 16. A glass type selection menu is illustrated on the display screen 10 appearing in FIG. 3 in the outboard lite title bar 16 with indicia identifying the glass types (laminated and monolithic), and which glass type is selected (as shown by the arrow 17 pointing to monolithic).

In the screen display 10 illustrated in FIG. 3, monolithic glass has been selected. Associated with the monolithic glass as a selection are further secondary glass type selections which are presented to the user and which appear in the outboard lite window 15. When the monolithic glass type is selected, as the selection indicia 17 indicates in FIG. 3, the secondary glass type menu 20, shown as a dropdown menu, provides further selections for the monolithic glass. For example, as shown, Low-E type (or low emissivity) glass is selected.

Once the monolithic glass type is selected, an instruction may be displayed on the display screen 10, in a window (presenting text or graphics) or an audible message given, or both. The instruction is provided to facilitate prompting of a further selection from the user, such as a selection for the secondary glass type, in this illustration, Low-E. One or more additional selections for further specifying the glass product are provided. In this example, secondary glass types for the monolithic glass are provided to appear in the second or outboard lite selection window 15. Monolithic glass types may be further specified by one or more additional properties. For example, the monolithic drop down menu 20 provides monolithic glass types including Low E, Advanced Tint, Basic Tint, and Reflectives (only the selected type, here Low-E being shown). Further information from which additional selections may be made to configure the glass specification is provided on the screen display 10. In this example, where the user has already selected monolithic glass, the input device may be operated by the user to correspond with the monolithic glass types. For example, when Low E is selected, as it is in FIG. 3, a listing 21 of outboard lite glass is displayed in the outboard lite selection window 15, providing additional information in the form of selections of Low E type monolithic glass. In the example illustrated in FIG. 3, two monolithic glass lites are listed 22, 23 and appear in the outboard lite selection window 15.

A color selection menu 25 is provided. Preferably, the color selection menu 25 comprises a visual display of indicia corresponding to color choices for glass product or glass component. In the present example, the color selection menu 25 shown in FIG. 3 illustrates a plurality of colors, including, neutral, clear, gray, bronze, green, green-blue, blue, gold, silver. Other colors and variations may be included. Color data is for the most part a property of the glass products or glass components comprising the glass product, such as for example, the outboard lite monolithic glass component of an insulating glass fabrication. The color data is stored in the data storage device and preferably is associated with glass components and/or the glass products which may be comprised of one or more glass components and the performance data for these glass products and components. The color selection menu 25 provides a choice for the glass color. As shown in FIG. 3, green is the selected color. Preferably the graphic displays a green color in the selected portion 30 of the color menu 25. Preferably, the color selection menu's window 25 is animated. As shown in FIG. 3, the animation comprises as enlargement of the selected portion or rectangular color bar 30, so that more of the green color is visible. In addition, further indicia is provided in a flag window 31 which provides information, such as for example, text, indicating the color selected.

The color selection menu 25 preferably comprises a color graphic which provides a plurality of colors, such as, for example, as shown in FIG. 3, as a plurality of rectangular bars, which may be selected. Preferably, the color graphic may be animated or enhanced to differentiate the selected color from other colors appearing in the color selection menu 25. In addition, color areas, such as rectangles, may be displayed for viewing on the screen display 10, and the area of the selected color may be made to appear more prominent when the user input device is positioned to correspond with a color area. For example, the color area may be expanded to designate a particular color selection, as shown in FIG. 3.

The color data for the monolithic glass is associated with glass type data to provide a listing of the potential outside lite panels which a user may select as an outboard lite for an insulating glass fabrication (FIG. 3).

The selected information from the fabrication menu 11, the outboard lite title bar menu 16, the glass type menu 20, and the color selection menu 25 is associated with glass products or glass components for a glass product, and is presented to the user for further selection of glass products or glass components which are available for particular performance selections. Preferably, a selection of glass component products associated with the user's selections is presented on the screen display 10. As illustrated in FIG. 3, two choices are available, respectively identified in the outboard lite product window 15 as a first glass item or glass component 22 and a second glass item or glass component 23. Each glass item or glass component identified may have different properties from another glass product.

Each glass component product identified in FIG. 3 has particular properties. A user who selects, for example, monolithic, Low E, green color glass, as is illustrated in the selections appearing on the screen display 10 of FIG. 3, has one or more glass items or glass components for the outboard lite panel presented for display. These glass items 22, 23 are identified on the screen display 10 to provide further information about the glass available for selection as an outboard lite of the insulating glass fabrication.

Figure 4:
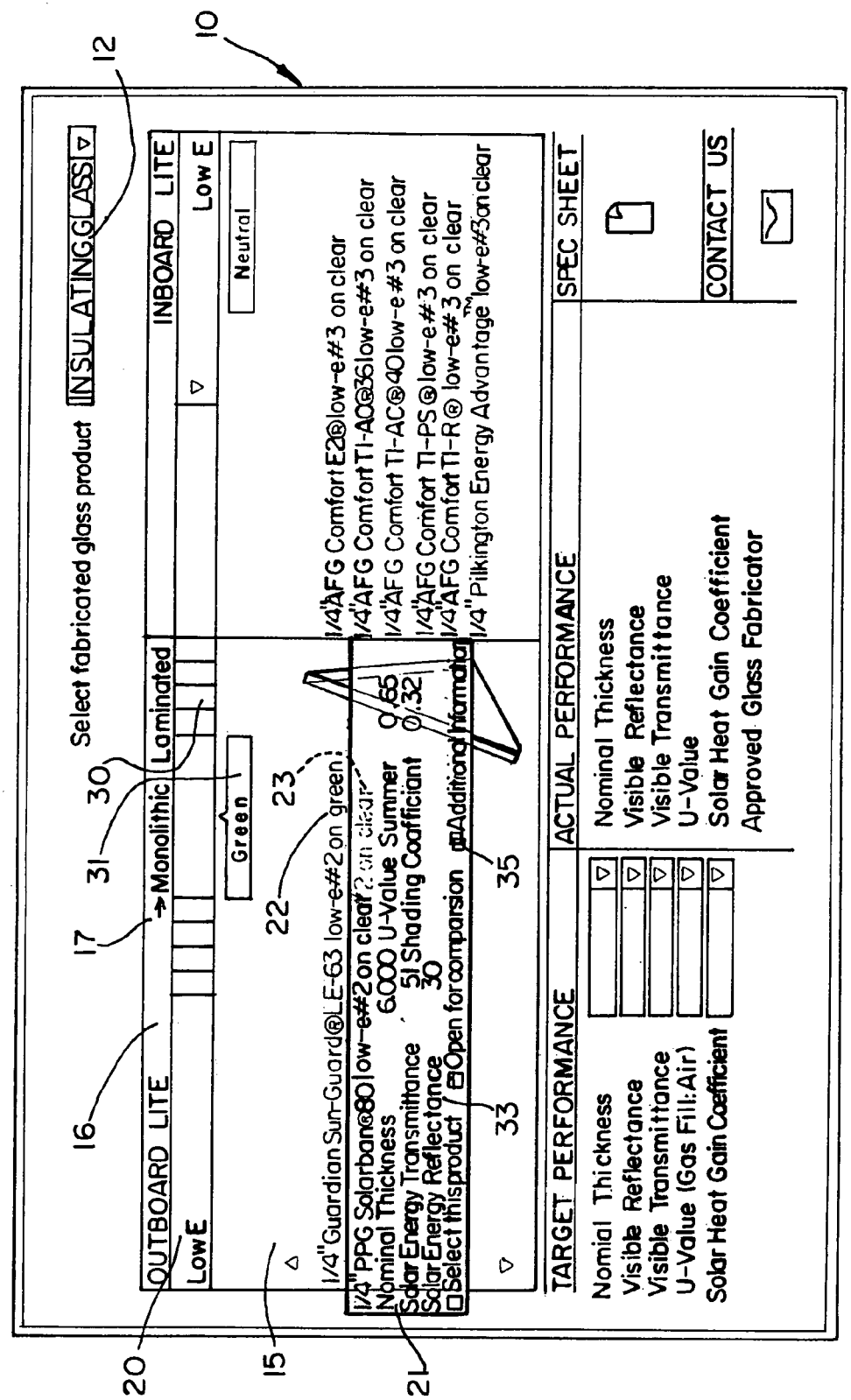
FIG. 4 is a printout of a screen display showing a product selection window.

Preferably, the display of product information data which is stored in a data file in the data storage device is provided in a product selection window 33 (FIG. 4) which lists further glass properties. For example, the glass properties listed for a particular glass in the product selection window 33 preferably may include, nominal thickness, visible light transmittance, visible light reflectance, U-value (winter), shading coefficient, and other pertinent information.

Figure 5:
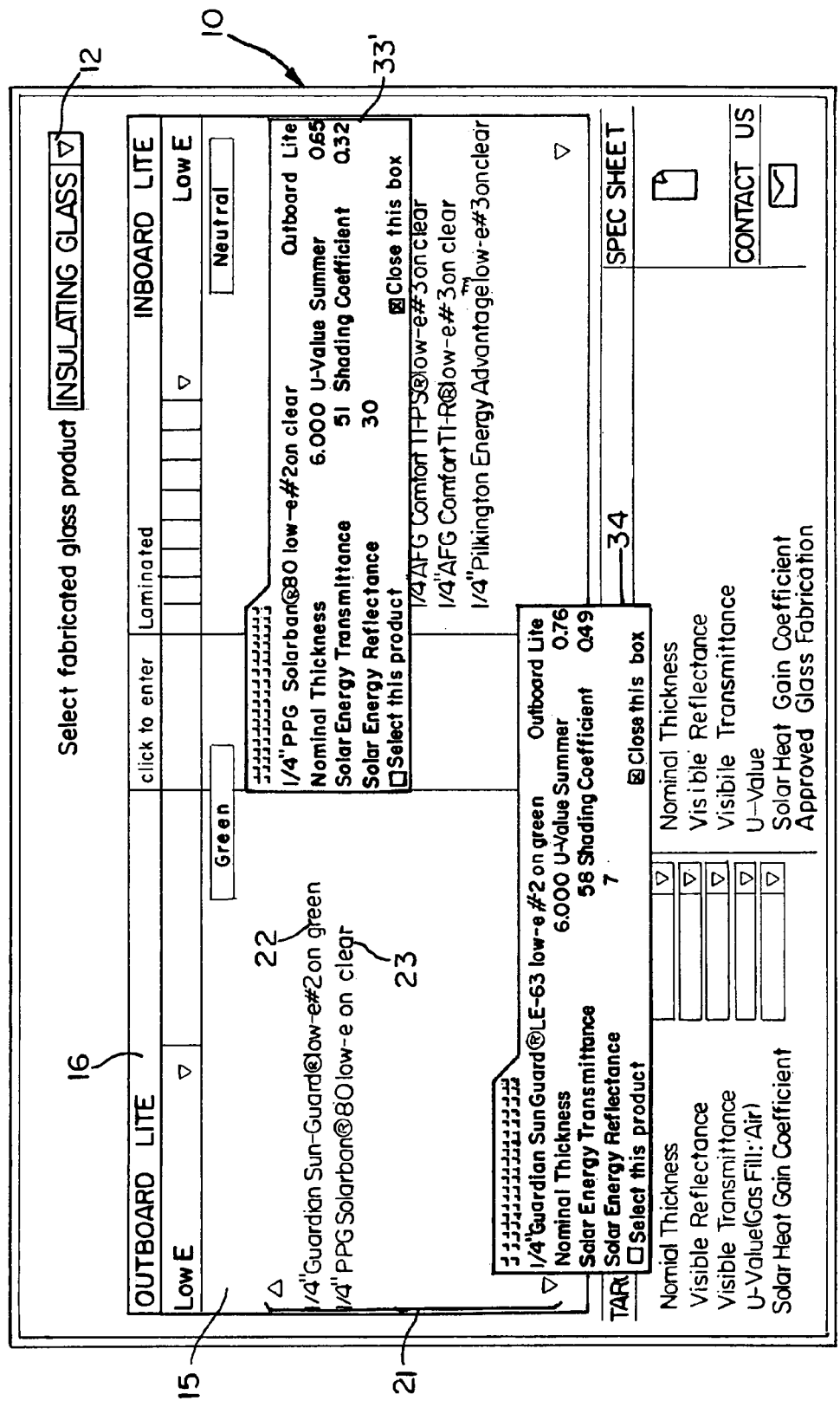
FIG. 5 is a printout of a screen display showing a product selection window.

The product selection window 33 provides a selection option for opening the window 33 so that it remains on the screen display 10 for viewing to facilitate comparisons between one or more items available for selection. A user may determine that what is presented in the product selection window 33 is acceptable. However, the present invention provides the user with the opportunity to explore further glass components and compare them. The product selection window 33 can be opened, and the user may elect to have one or more product selection windows remain on the screen so the user can compare performance properties for each of the glass items identified in the product selection windows. In FIG. 5, the product selection window 33 shown in FIG. 4 has been selected to remain open. In the open product selection window 33' shown in FIG. 5, the second listed glass item 23 has been selected. Another product selection window 34 also shown in FIG. 5 has been selected to remain open to identify the first listed outboard lite glass component 22 and the identification of performance properties for that item 22. The product selection windows 33, 34 illustrate the differences for the glass items or components 22, 23 by providing performance information which a user may compare.

Further information may be available for a particular glass product or glass component. Preferably, as shown in the product selection window 33 in FIG. 4, an indicating graphic 35 may be displayed to advise the user that further information is available. The additional information about the glass product or component is stored in the storage device, and may be displayed when a user selects the indicating graphic to have displayed on the display screen 10 additional information.

Figure 6:
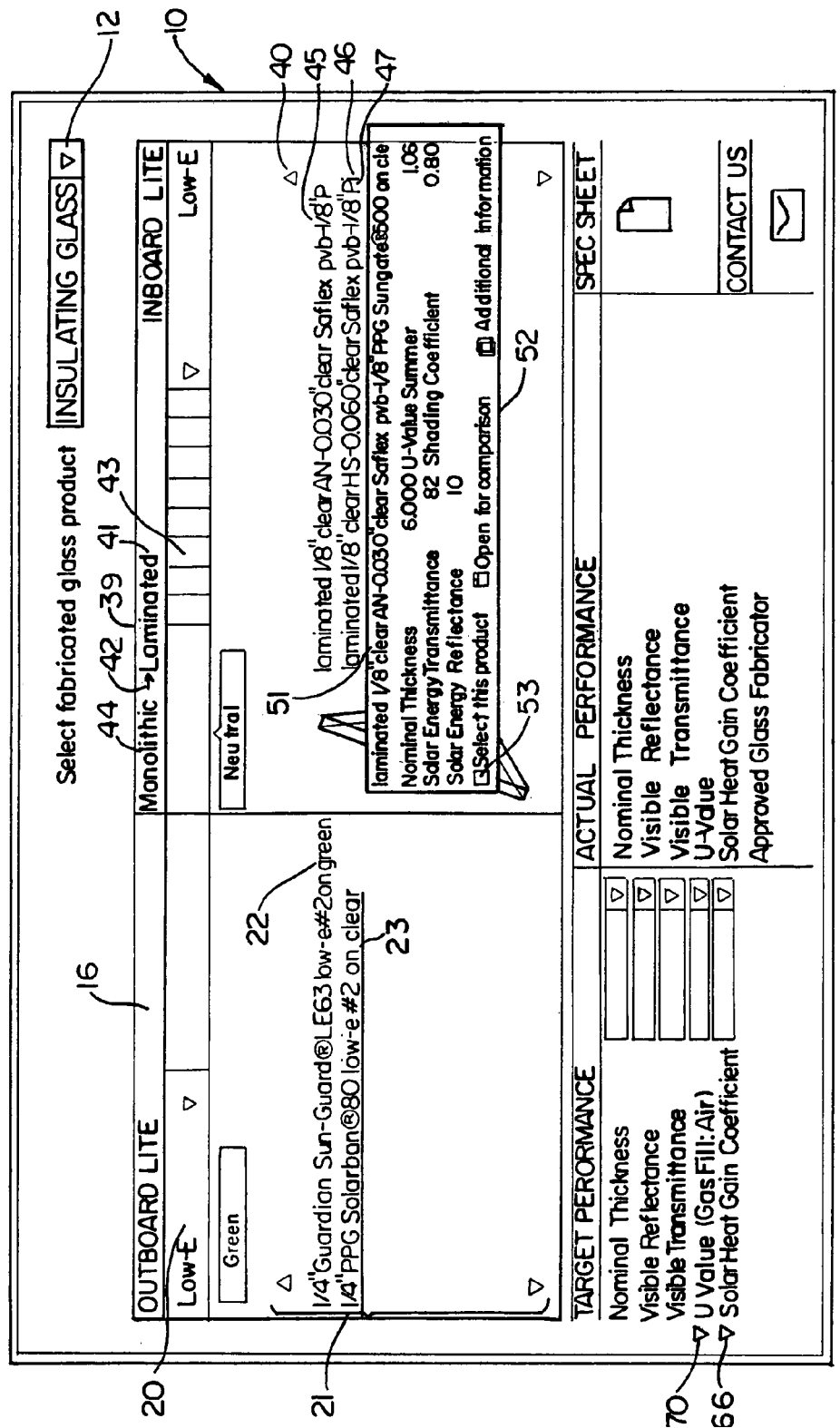
FIG. 6 is a printout of a screen display showing a product selection window for an inboard lite glass.

The product display window 33 also has a selection graphic, so that a particular glass item may then be selected by the user. Referring to FIG. 6, the second listed glass item 23 has been selected, and the list of glass outboard lites 21 is provided with selection indicia, shown, for example, comprising underlining.

The selection process is then continued in the similar manner for the inboard lite panel. The inboard lite selection window 40, shown in FIG. 6, includes further glass types for selection, such as, for example, laminated and monolithic glass types in the inboard lite title bar 41. A glass type selection menu 44 is illustrated on the display screen 10 appearing in FIG. 5 in the inboard lite title bar 41 with indicia identifying the glass types (laminated and monolithic) and identifying which glass type is selected (as shown by the arrow 39).

The selections for the inboard lite glass may be made in the manner described herein as described and illustrated for the selections of the outboard lite. The user may select an inboard lite as a component for the insulating glass fabrication. The user may select the glass type (e.g., monolithic, laminated or other glass type) from the glass type selection menu 44 illustrated in the title bar 41. The color of the inboard lite glass may be selected through a color selection menu 43. The inboard lite may be selected from a listing 51 of potential inboard lite glass components 45, 46, 47, 48, 49 which are listed on the inboard lite selection window 40.

In FIG. 6, once an inboard lite item has been selected from the listing 51, a product selection window 52 opens to identify the user's selection of that glass component, here item 46, from the inboard lite glass components shown as available choices in the inboard lite selection window 40. The selection indicia, shown here for example comprising a check mark, is designated by the user to make a selection of the glass component or item 46, which is identified as "laminated ⅛" clear AN—0.030" clear Saflex pvb—⅛" PPG Sungate® 500 on cle[ar]". Once selected, the glass component selection 46 is underlined, as shown in FIG. 7.

Figure 7:
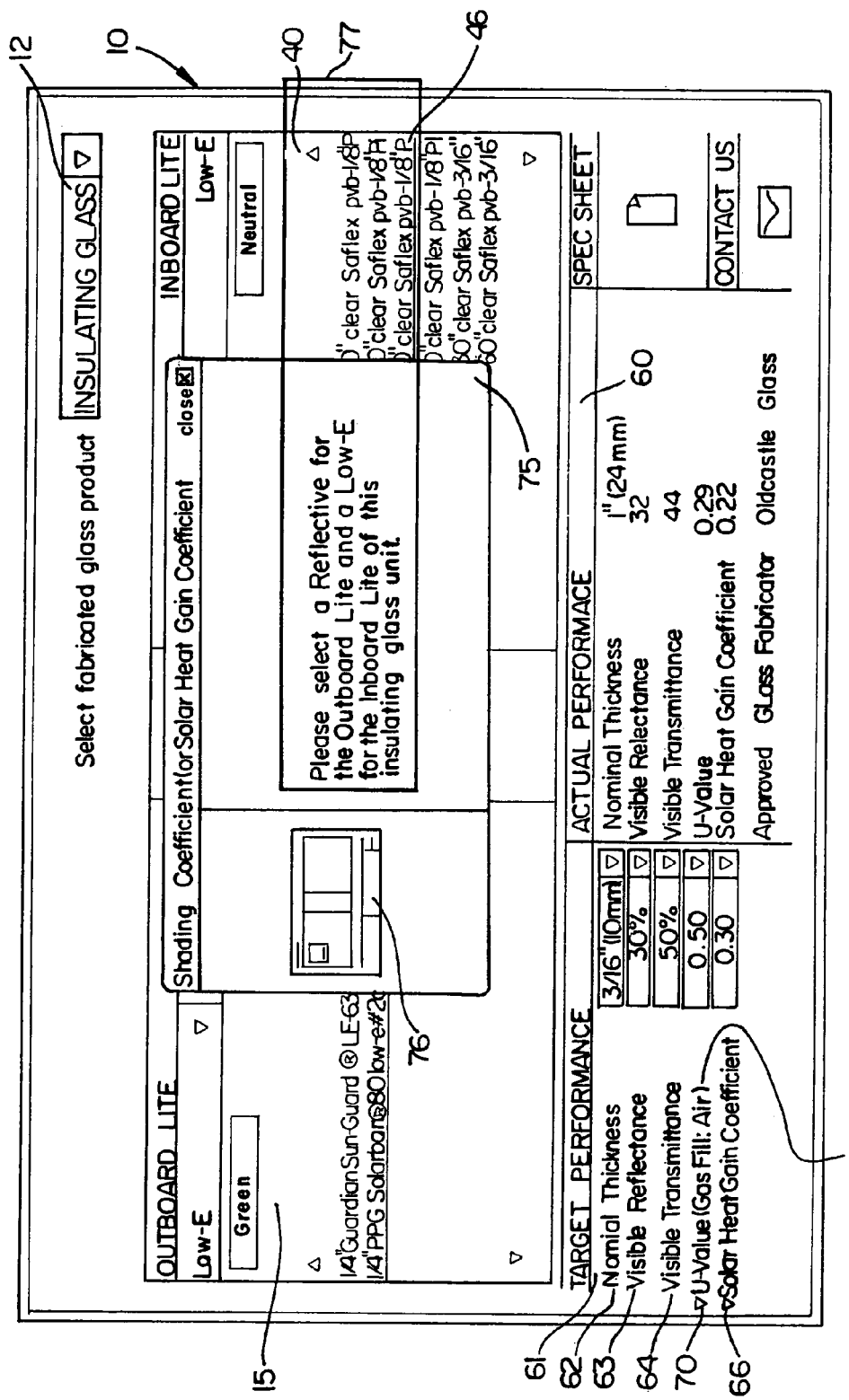
FIG. 7 is a printout of a screen display showing the target performance window and the actual performance window.

Referring to FIG. 7, there is illustrated an actual performance window 60 and a target performance window 61. The actual performance window 60 provides a visual display of the performance properties for a glass fabrication product, in this example, for an insulating glass product comprised of an outboard lite panel and an inboard lite panel. The performance properties listed for the glass product in the actual performance window 60 include nominal thickness, visible reflectance, visible transmittance, U-value, solar heat gain coefficient, and approved glass fabricator.

The target performance window 61 identifies target performance characteristics for a glass product. The target performance window 61 has a plurality of performance menus 62, 63, 64, 65, 66 associated with glass performance characteristics. The nominal thickness performance menu 62 permits the input of a target thickness to be designated. As shown in FIG. 7, the user has designated a target nominal thickness for the desired glass product as ⅜" (10 mm). The visible reflectance target value is designated to be 30% in the visible reflectance performance window 63. The visible transmittance window 64 shows that the user has designated 50% for that target performance characteristic. The U-value performance window 65, (gas fill property), is selected to be 0.50, and the solar heat gain coefficient has been selected at 0.30, the value shown in the solar heat gain coefficient selection window 66. Preferably, a dropdown menu may be provided for the user to select one ore more, or a range of target performance values. In addition, where performance characteristics may be measured by different methods, or where one value may be appropriate to know for different glass products. For example, the U-Value may be measured where the gas fill is air, or where the gas fill is argon or some other gas. The secondary selection indicia, illustrated for example as an arrow 70, permits the user to select an appropriate performance target based on air, argon or other fill gas. Similarly, the solar heat gain coefficient window 65, also provides secondary selection indicia, which may for example, list a shading coefficient, and accordingly permit selections to be made by a user based on this performance characteristic.

The system recognizes the performance values entered by the user and processes the target performance values to compare the target performance characteristics with the actual performance characteristics shown in the actual performance window 60. Where one or more of the designated target performance values deviate when compared with the actual performance values (or a range of predetermined values), further information may be provided on the screen display 10. An instruction window 75 is shown in FIG. 7. The instruction window 75 presents information based on an association between the comparison of target performance values designated and the actual performance values for a selected glass product. The instruction window 75 provides indicia to facilitate arriving at a glass product which is more likely to be acceptable to a user based on the user's designated target performance values. The information window 75 provides a map graphic 76 to facilitate the location on the display screen 10 corresponding to instructive indicia, such as for example instructive text 77. In the example illustrated in FIG. 7, the instruction window 75 has a title bar 78 where the performance characteristic which is being addressed is identified. In FIG. 7, the shading coefficient is identified, and the instructive text 77 indicates that reflective glass type for the outboard lite and Low-E glass type for the inboard lite of the insulating glass product are more likely to approach the designated performance characteristics shown in the target performance window 61.

The selection of alternate glass component products with the present system may be done without having to repeat prior selections which are to remain as part of a subsequent selection. For example, if the user wants to select a reflective glass for the outboard lite, the user may do so, and the prior selections, such as for example, the selection of insulating glass as the glass fabrication type and the inboard lite glass selection may remain. The selection of an alternate outboard lite, for example, then provides updated actual performance characteristics in the actual performance window 60.

A user may input desired properties for a glass product. This may be done prior to selecting a glass product type or after the selection of a glass product type. For example, the target performance provides a window where the user can select properties for a glass product. The target performance window can be checked against the actual performance window so that a user may view both displays at the same time in order to evaluate the glass product.

Figure 8:
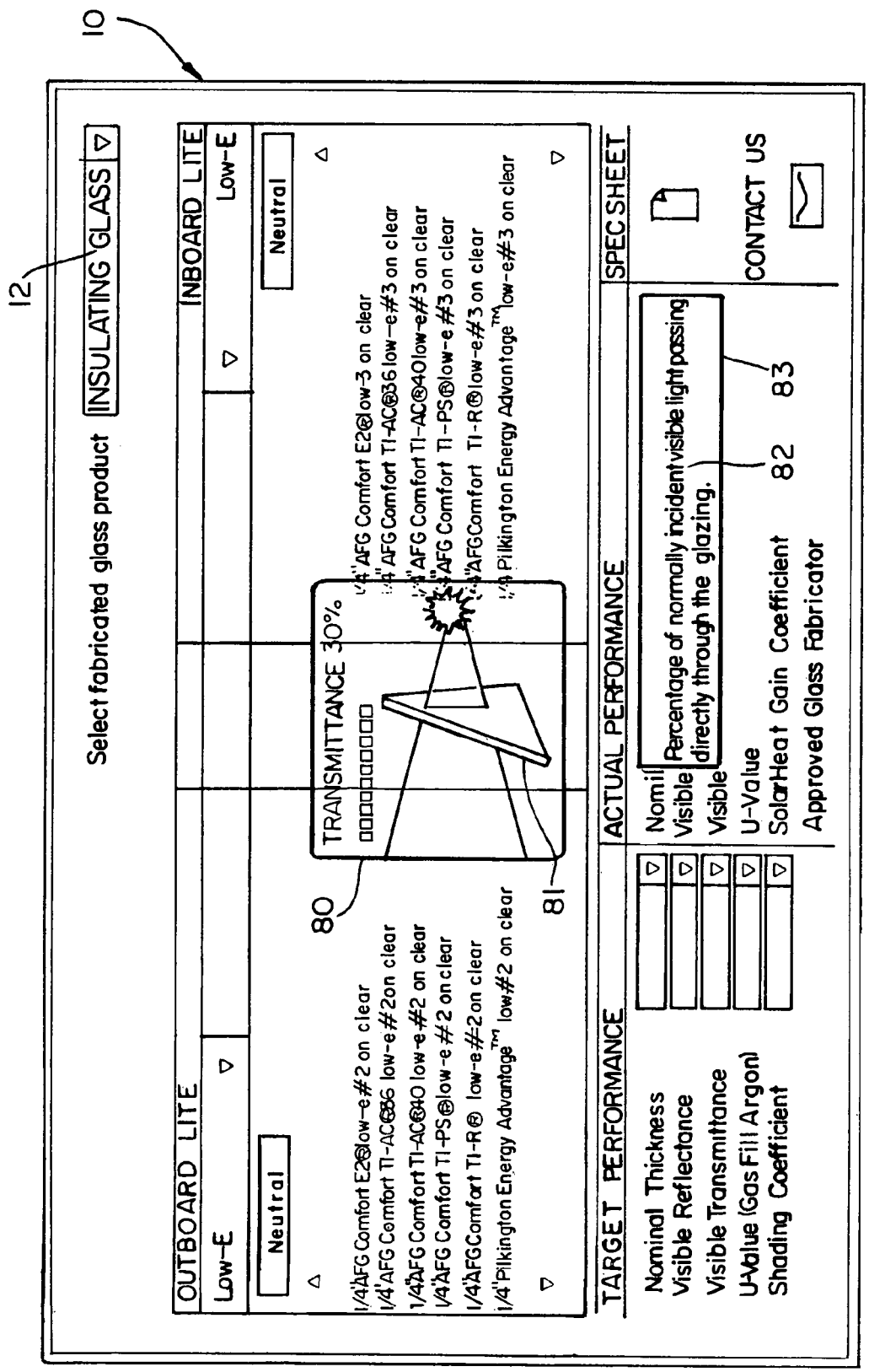
FIG. 8 is a printout of a screen display showing an information graphic window.

Information graphics preferably may be associated with one or more glass properties or performance characteristics to facilitate the selection of a glass product. For example, an information graphic 80 is illustrated in FIG. 8. The information graphic window 80 is associated with transmittance performance for glass products and provides a graphical representation 81 of transmittance along with informative text 82 which is provided in a text window 83. Preferably, an information graphic window may be associated with the performance characteristics, glass types, fabrication types as well as other information provided on the display 10. An information graphic window, such as the information graphic window 80 illustrated in FIG. 8, is preferably activated when a user moves an input device to correspond with text or graphics on the display relating to the performance characteristic, glass product or fabrication type, or other property appearing on the display. The information graphic window can include a still graphic image, an animation graphic, text or a combination of these, to provide further information corresponding with a display item or glass property.

Preferably, data is stored in the data storage device which includes glass properties, such as, for example, glass type, performance characteristics, and color. The glass properties may include spectral data for a glass product or component: Each glass product and glass component preferably has associated data. When the user makes a selection of a glass property, such as for example, Low-E, for a monolithic outboard lite, the software operates the processor to compare the glass components or products which meet the selections, and the software operates the processor to include one or more glass components or products meeting the selected characteristics. In this manner, as the user makes selections with the present system, apparatus and method, the potential available choices for glass products or components meeting the user's desired target, based on the selection inputs, are narrowed. Preferably this is done with each selection, so that by the time the user has made a final selection, the actual performance data can be readily displayed in the actual performance window 60.

The system facilitates obtaining a glass specification, and utilizes the information and selections made by a user to arrive at a potentially suitable glass product. The product selections and actual performance data is processed to produce a glass specification. The glass specification can be transmitted to a location for arriving at an order for a glass product which meets the specification. The specification can be printed or may be electronically transmitted. The glass product can be purchased based on the user's selections, which form a glass specification suitably adapted to the color and performance characteristics selected by the user.

It will be understood that default selections for fabrication type, glass type, and other selection options, may be provided so that a menu has a selection, and the user may decide to accept or change the default selection.

The invention claimed is:

1. A method for purchasing a glass product, comprising the steps of selecting a glass product and transacting value for the purchase of the glass product, wherein selecting the glass product comprises identifying one or more properties for the glass product and processing with a computer a selection of a characteristic property to determine one or more glass products having the characteristic property, wherein the one or more identified properties are selected, and wherein the selection of one identified property can be changed to another selection which is processed with prior selections which were not changed to determine one or more glass products having the characteristic property, and wherein target performance characteristics and actual performance characteristics of the one or more glass products are displayed.

2. A method for purchasing a glass product, comprising the steps of:
(a) using a first computer capable of accessing a second computer through a communication linkage to communicate with the second computer;
(b) inputting an instruction from the first computer to the second computer to select one or more properties for a glass product;
(c) processing by the second computer the instruction to compare data properties for glass products stored in glass products data base associated with the selected one or more properties;
(d) identifying one or more glass products with the associated selected one or more properties;
(e) repeating steps (b) through (d) until an acceptable glass product is identified; and
(f) displaying actual performance characteristics of the acceptable glass product and target performance characteristics.

3. The method of claim 2, wherein after the selection of a first property for a glass product, the identification of one or more additional properties compatible with the first selected property is displayed for selection.

4. The method of claim 3, wherein the step of selecting one or more additional properties is repeated until no further selections are provided.

5. The method of claim 2, wherein any property selected for the selected glass product can be re-inputted to provide information identifying one or more glass products which may be different than the originally identified glass product.

6. The method of claim 2, further comprising the step of purchasing a glass product identified by the processing of the input of instructions selecting one or more properties of the glass products.

7. A method for purchasing a glass product, comprising the steps of:
(a) using a first computer capable of accessing a second computer through a communication linkage to communicate with the second computer;
(b) inputting an instruction from the first computer to the second computer to select one or more properties for a glass product;
(c) processing by the second computer the instruction to compare data properties for glass products stored in glass products data base associated with the selected one or more properties;
(d) providing guidance information to recommend changing one or more properties for a glass product to more closely approximate an actual performance of the glass product with a target performance, wherein the step of providing guidance information includes displaying said information on a display;
(e) identifying one or more glass products with the associated selected one or more properties; and
(f) repeating steps (b) through (e) until an acceptable glass product is identified.

8. The method of claim 2, wherein inputting an instruction from a first computer to a second computer to select one or more properties for a glass product includes selecting one or more components for a glass product based on color and performance characteristics.

9. The method of claim 7, wherein said one or more instructions include designating target performance characteristics for the glass product, wherein said target performance characteristics are selected from the group consisting of: nominal thickness, visible reflectance, visible transmittance, u-value, and shading coefficient.

10. The method of claim 7, wherein said one or more instructions include designating target performance characteristics for the glass product, wherein said target performance characteristics are selected from the group consisting of: nominal thickness, visible reflectance, visible transmittance, u-value, and shading coefficient, and
wherein processing the selection instruction to compare the data properties for glass products stored in glass products data base associated with the selection corresponding to the instruction includes processing the designated target performance characteristics to compare them to actual performance characteristics for the glass product comprised of the selected one or more components.

11. The method of claim 8, wherein said one or more instructions include designating target performance characteristics for the glass product, wherein said target performance characteristics are selected from the group consisting of: nominal thickness, visible reflectance, visible transmittance, u-value, and shading coefficient.

12. The method of claim 8, wherein said one or more instructions include designating target performance characteristics for the glass product, wherein said target performance characteristics are selected from the group consisting of: nominal thickness, visible reflectance, visible transmittance, u-value, and shading coefficient, and
wherein processing the selection instruction to compare the data properties for glass products stored in glass products data base associated with the selection corresponding to the instruction includes processing the designated target performance characteristics to compare them to actual performance characteristics for the glass product comprised of the selected one or more components.

13. The method of claim 1, wherein identifying one or more properties for the glass product includes designating target performance characteristics for the glass product, wherein said target performance characteristics are selected from the group consisting of: nominal thickness, visible reflectance, visible transmittance, u-value, and shading coefficient.

14. The method of claim 1, wherein identifying one or more properties for the glass product includes designating target performance characteristics for the glass product, wherein said target performance characteristics are selected from the group consisting of: nominal thickness, visible reflectance, visible transmittance, u-value, and shading coefficient, and
wherein processing with a computer the selection of the glass property to determine one or more glass products having the characteristic property includes processing the designated target performance characteristics to compare them to actual performance characteristics for the glass product comprised of the selected glass product.

15. A method for purchasing a glass product, comprising:
(a) selecting a glass product, and
(b) transacting value for the purchase of the glass product, wherein selecting the glass product comprises:
  (i) identifying one or more properties for the glass product including selecting one or more components for a glass product based on color and performance characteristics,
  (ii) processing with a computer the selection of the glass property to determine one or more glass products having the characteristic property, wherein the one or more identified properties are selected, and wherein the selection of one identified property can be changed to another selection which is processed with prior selections which were not changed to determine one or more glass products having the characteristic property; and
  (iii) displaying target performance characteristics and actual performance characteristics of the glass product.

* * * * *